2,986,548
Patented May 30, 1961

2,986,548
ORGANOPOLYSILOXANE RESINS

Joseph R. McLoughlin, Ballston Lake, N.Y., assignor to General Electric Company, a corporation of New York No Drawing. Filed Aug. 20, 1959, Ser. No. 834,956

7 Claims. (Cl. 260—45.85)

This application is a continuation-in-part of my copending application Serial No. 573,627, filed March 26, 1956, now abandoned, and assigned to the same assignee as the present invention.

This invention is concerned with improving the shelf life or storage stability of organopolysiloxane resins containing alkaline condensing or curing agents, and methods for preparing such stable composition, which comprises incorporating in such resins small amounts of an organic acid readily removable from the resin at the time of cure, the said organic acid being incorporated in an amount sufficient to stabilize the resin, but insufficient to affect adversely the curing rate of the resin in subsequent applications.

It has been known in the past that organopolysiloxane resins can be cured by heat much more rapidly to the substantially infusible and insoluble state and give improved properties in the cured state if one employs as the condensation catalyst (or curing agent) an alkaline condensation catalyst. However, although the amount of alkaline condensation catalyst present in the curable organopolysiloxane is very small (e.g., 0.001 to 1 percent, by weight, based on the weight of the organopolysiloxane), serious problems of storage are inherent in such mixtures, particularly those containing the strong bases such as quaternary bases, and especially in connection with resin solutions of high solids content. Because of these factors, such mixtures are quite unstable in storage and generally become cloudy and advance in the state of cure within a period of only a few days, and sometimes after only a few hours. This, of course, interposes a difficult and serious handling problem. Because of the low rate of stability, resins of this sort have to be used promptly after they are catalyzed with the alkaline condensation catalyst or else must be refrigerated in order to reduce the activity of the resin. However, such procedures are usually not practical and in general limit the uses of such highly desirable fast curing, low-temperature-curable resins.

The term "alkaline condensation catalyst" or "alkaline curing agent" as employed in the specification and appended claims is intended to mean and include curing agents for organopolysiloxane resins of an alkaline nature as distinguished from the many non-alkaline drier type curing agents of lower activity which are described in Welsh Patent 2,449,572. These alkaline condensation catalysts consist of quaternary ammonium and phosphonium compounds. The quaternary ammonium compounds have the formula (R')$_4$NOR" where R' represents members selected from the class consisting of alkyl radicals, e.g., methyl, ethyl, propyl, n-butyl, hexyl, octyl, etc., radicals; cycloalkyl radicals, e.g., cyclohexyl, cycloheptyl, etc., radicals; aryl radicals, e.g., phenyl, diphenyl, etc., radicals; alkaryl radicals, e.g., tolyl, xylyl, etc., radicals; aralkyl radicals, e.g., benzyl, phenylethyl, etc., radicals; and mixtures of the aforesaid radicals, and R" is a member selected from the class consisting of hydrogen and alkyl radicals, e.g., methyl, ethyl, propyl, butyl, etc., radicals, as, for instance, quaternary ammonium hydroxide, tetrabutyl ammonium hydroxide, quaternary ammonium alkoxides (e.g., quaternary ammonium butoxide, quaternary ammonium ethoxide, etc.), etc. Quaternary phosphonium compounds having the formula (R')$_4$POR" where R' and R" have the meanings given above, for instance, tetramethyl phosphonium hydroxide, tetraethyl phosphonium hydroxide, tetra-n-butyl phosphonium hydroxide, tetraoctyl phosphonium hydroxide, dimethyl diethyl phosphonium hydroxide, phenyltrimethyl phosphonium hydroxide, butyl tricyclohexyl phosphonium hydroxide, tetramethyl phosphonium methoxide, tetrabutyl phosphonium butoxide, etc.

Unexpectedly, I have discovered that these active organopolysiloxane resins containing the alkaline catalysts can be readily stabilized to yield resinous solutions which are stable at temperatures of from 25° to 50° C. for long periods of time (e.g., from 4 to 6 months or more) without impairing the properties of films obtained by curing solutions of the resin at elevated temperatures. The aforesaid difficulties can be obviated and improved stability built into the unstable organopolysiloxane resins containing such alkaline catalysts by incorporating therein small amounts of certain halogenated organic acids which are readily removable from the resin during the heat-curing step. These acids can be readily volatilized (at curing temperatures of the resin) at the same time that the resin solvent is being removed during the curing step. The amount of acid used, on a weight basis, is preferably within the range of from about 0.001 to about 1 percent of the acid based on the solids content of the resin in the resinous solution and is in the range of from 0.25 to 5 mols acid per mol alkaline curing agent in the resin.

The organopolysiloxane resins with which the present invention is concerned are those which are obtained by effecting hydrolysis of two or more hydrolyzable organosilanes of the general formula $R_nSiX_{4-n}$ where R is a radical selected from the class consisting of monovalent hydrocarbons and halogenated (e.g., chlorinated) hydrocarbon radicals, X is a hydrolyzable group, e.g., chlorine, bromine, ethoxy, propoxy, acyloxy, aryloxy, etc., and $n$ is a whole number equal to from 1 to 3, it being understood that there is a sufficient amount of the compound RSiX$_3$ present in the mixture of hydrolyzable organosilanes to give an organic-to-silicon ratio of between 1.1 to 1.85. Among the radicals which R may represent are, for instance, alkyl (e.g., methyl, ethyl, propyl, butyl, isobutyl, etc.); aryl (e.g., phenyl, naphthyl, anthracyl, etc.); alkaryl radicals (e.g., tolyl, xylyl, ethylphenyl, etc.); aralkyl radicals (e.g., benzyl, phenylethyl, etc.); halogenated aryl (e.g., chlorophenyl, tetrachlorophenyl, etc.). The presence of other silicon-bonded radicals, for instance, hydroxyl, vinyl, allyl, etc., radicals is not precluded. Such resins may also contain in the hydrolyzed state two or more different radicals attached to silicon as is the case with the methyl phenylpolysiloxanes which can be obtained, for example, by cohydrolysis of dimethyldichlorosilane methyltrichlorosilane, and methyl phenyldichlorosilane. Preferably the organopolysiloxane resins employed in the practice of the present invention are methylphenylpolysiloxanes.

Examples of mixtures of organochlorosilanes (or organoalkoxysilanes which may be substituted for the organochlorosilanes) which may be employed in the preparation of organopolysiloxanes with which the present invention is concerned are, for instance, mixtures of methyltrichlorosilane and dimethyldichlorosilane; mixtures of methyltrichlorosilane, dimethyldichlorosilane and phenyltrichlorosilane; mixtures of dimethyldichlorosilane, methyltrichlorosilane and diphenyldichlorosilane; mixtures of methyltrichlorosilane, phenyltrichlorosilane, dimethyldichlorosilane and diphenyldichlorosilane; mixtures of methyltrichlorosilane, ethyltrichlorosilane, and dimethyldichlorosilane, etc. In choosing the mixtures of the hydrolyzable organosilanes, attention should be given to the use of such hydrolyzable organosilanes which in the final hydrolyzed product will yield an organopolysiloxane having an average of between 1.1 to 1.85 total organic groups per silicon atom bonded to the silicon atoms by carbon-silicon linkages. Examples of organopolysiloxanes having the above-mentioned silicon-bonded hydrocarbon and halogenated hydrocarbon radicals attached thereto within the organic-to-silicon ratio above are found, for instance, in U.S. Patent 2,449,572, issued September 21, 1948, U.S. Patents 2,258,218–222, issued October 7, 1941, and U.S. Patent 2,383,827, issued August 28, 1945. These patents, as well as other references in the literature, give preferable molar concentrations of the hydrolyzable organosilanes (which prior to hydrolysis may have intermixed therewith small amounts of silicon tetrachloride or alkyl orthosilicates) which are advantageously employed in making the resins stabilized in accordance with the present invention.

The halogenated acids employed in the practice of this invention are aliphatic carboxylic acids containing from 2 to 5 carbon atoms and containing at least 2 alpha halogen atoms selected from the class consisting of chlorine and bromine. Included among the acids which are employed in this invention are dichloroacetic acid, trichloroacetic acid, alpha,alpha-dichloropropionic acid, alpha,alpha-dichlorobutyric acid, alpha,alpha-dichlorovaleric acid, dibromoacetic acid, tribromoacetic acid, etc. The preferred acid for use in the practice of my invention is trichloroacetic acid.

As pointed out above, the amount of acid stabilizer added is preferably within the range of from about 0.001 to 1 percent, by weight, based on the weight of the organopolysiloxane solids, although concentrations outside these ranges may be used under some conditions so long as the mol ratio of acid to catalyst is within the range recited above. In general, the invention herein described is best suitable in connection with organopolysiloxane resins which have a basicity content of between 0.001 to 1 percent of alkaline condensation catalyst, based on the weight of the organopolysiloxane resin solids. Within this range, usually optimum rates of cure are attained although it will be apparent to those skilled in the art that ranges of basicity outside the above preferred range may be employed without departing from the scope of the invention. In general, too high a basicity of the resin will make it more difficult to stabilize the resin with the volatile acidic stabilizers. In general, it has been found that as the boiling point of the acidic stabilizer increases, the rate of cure of the resin will decrease. Thus, it will take longer times to cure resins stabilized with $\alpha,\alpha$-dichloropropionic acid than those stabilized with trichloroacetic acid. This can be overcome to a large extent by increasing the temperature at which curing of the resin containing the less volatile acid stabilizers takes place. Such a consideration must be factored in with the basicity of the resin as well as the type of resin being used.

It was unexpected to find that the type of acidic stabilizer employed was important since all acids did not act in the same way. Thus, it was found that although mineral acids such as hydrochloric acid or sulfuric acid can be used to prolong the storage stability, such inorganic acids interfere undesirably with the cure of the resin, even if the cure is conducted at higher than usual temperatures, so that the incorporation of these mineral acids interferes with one of the main objectives of the present invention, namely, to improve storage stability without unduly affecting the curing ability of the resin in subsequent applications. In addition to the unexpected inability of mineral acids to effect the desired objectives, it has also been found that other materials which upon hydrolysis, for instance, upon contact with the air, give off hydrogen chloride such as organochlorosilanes, for instance, phenyltrichlorosilane, when added for stabilization purposes to the organopolysiloxane containing the alkaline catalyst, also fail to act in the same manner as the organic acids and interfere with the rapid cure of the resin.

In view of the fact that strong mineral acids are unsatisfactory for the stabilization of resins because these mineral acids prevent the rapid cure of the alkaline curing agent catalyzed resin, it was unexpected to find that the strong halogenated acids of the present invention would be operable for this purpose. Since many of the alpha-halogenated acids employed in the practice of this invention are almost as strong as mineral acids, it would be expected that these alpha-halogenated acids would also affect the curability of the resin. Contrary to this expectation, it has been found that while these alpha-halogenated acids are extremely effective as stabilizers, they do not interfere in any way with the conditions required for resin cure.

A still further unexpected result obtained with the alpha-halogenated acids employed in the practice of the present invention is that effective stabilization of the alkaline curing agent catalyzed resin is accomplished with less of the acid than would be required to neutralize the alkaline curing agent itself. Thus, it has been found that effective stabilization is obtained with as little as 0.25 mol of the alpha-halogenated acid per mol of the alkaline curing agent. This is in contrast to non-halogenated aliphatic carboxylic acids which must be used in a molar excess to effect satisfactory stabilization. Of course, stabilization is also effected using a molar excess of these alpha-halogenated acids and the optimum range for stabilization is with from 0.25 to 5 mols of the halogenated acid per mol of the alkaline curing agent.

In order that those skilled in the art may better understand how the present invention may be practiced, the following example is given by way of illustration and not by way of limitation. All parts are by weight.

The organopolysiloxane resin employed in the tests described in the following example was prepared by cohydrolyzing equimolar concentrations of phenyltrichlorosilane and dimethyldichlorosilane in a hydrolysis medium composed of toluene and water. The resin solution thus obtained (after separation from the water) was filtered and stripped of solvent until a methyl phenylpolysiloxane resin solids content of about 50 percent was obtained. The viscosity was about 25 centiposies when measured at 25° C. Tetramethyl ammonium hydroxide (as a condensation catalyst for the resin) was added in an amount equal to about 0.015 part of the latter per 100 parts of the resin solids in the resinous solution.

EXAMPLE

To the resin described above were added varying amounts of trichloroacetic acid. The percentage acetic acid added was based on the weight of the resin solids in the resinous solution. The following Table I shows the number of mols of acid per col catalyst and the results of the aging tests conducted on the stabilized resins. This test consisted in maintaining the resin solution with or without the acetic acid at temperatures of about 25° C. and at 50° C. for varying lengths of time. The shelf life or degree of stabilization was arbitrarily taken as the length of time required for the tested resin became so viscous that it exhibited no visible flow when inverted in a sealed tube.

Table I

| Percent Acid | Mols Acid Per Mol Catalyst | Test Temperature, °C. | Stability |
| --- | --- | --- | --- |
| 0 | 0 | 25 | Gelled in less than 7 days. |
| 0 | 0 | 50 | Gelled in less than 3 days. |
| 0.02 | 0.75 | 50 | Not gelled after 36 days. |
| 0.01 | 0.37 | 50 | Not gelled after 150 days. |
| 0.007 | 0.26 | 50 | Not gelled after 24 days. |

All of the foregoing resin mixtures containing the varying amounts of trichloroacetic acid could be readily cured at essentially the same rate as when the acid was omitted from the resin.

The stabilized organopolysiloxane resin solutions (which may be in more dilute concentrations and as low as 1 to 2 percent, by weight solids) can be employed in various applications. Thus, these resins (in solvents such as toluene, xylene, benzene, trichloroethylene, etc.), may be used to coat electrically conducting metallic cores (e.g., copper, aluminum, alloys of copper, etc.) which can then be heat-treated at temperatures ranging from about 150 to 200° C. to obtain heat-resistant flexible insulated wires. Various types of electrical equipment, including coils, can be dipped in these resinous solutions and can be again heat-treated to give moisture-resistant surfaces exhibiting good electrical properties. In addition, these resinous solutions can be further diluted and employed for treating various masonries to render the same water-repellent as is more particularly disclosed in Brick Patent 2,574,168.

In many of the above applications, as well as in the other applications for which organopolysiloxane resins are currently employed, one of the main problems is to maintain the stability of the resin so that in cases of transit over long distances or when stored for long periods of time, especially in environments where temperatures may rise above normal temperatures, the resin solution remains substantially unchanged over long periods of time under such conditions in order that undesirable changes in the properties of the cured resin may not be encountered due to the unexpected advancement in the state of cure of the resin prior to use.

Because of the desirability of using alkaline condensation catalysts with their attendant rapid cures of organopolysiloxane resins, it is possible for the manufacturer of the resin to incorporate these alkaline condensing agents in the resin prior to shipment to the end user who may not have the necessary equipment to do his own blending of the resin solution with the alkaline condensation catalyst. Unless organopolysiloxane resin solutions containing these alkaline condensation catalysts can be adequately stabilized, this important advantage cannot be attained. The present invention permits use of these desirable condensation catalysts with organopolysiloxane and yet allows a large time leeway between incorporation of the alkaline condensation catalyst and use of the resin containing the said catalyst.

What I claim as new and desire to secure by Letters Patent of the United States is:

1. A resinous composition of matter of improved stability against increase in viscosity at temperatures of from 25 to 50° C. comprising (1) a methylphenylpolysiloxane resin solution containing an average of from 1.1 to 1.85 total methyl and phenyl groups per silicon atom in the methylphenylpolysiloxane, (2) a quaternary compound curing catalyst selected from the class consisting of quaternary compounds having the formula $(R')_4NOR''$ and quaternary phosphonium compounds having the formula $(R')_4POR''$, where $R'$ represents members selected from the class consisting of alkyl, cycloalkyl, aryl, alkaryl, and aralkyl radicals, and where $R''$ is a member selected from the class consisting of hydrogen and alkyl radicals, and (3) an aliphatic carboxylic acid having from 2 to 5 carbon atoms and containing at least 2 alpha-halogen atoms selected from the class consisting of chlorine and bromine, the said acid being present in an amount equal to from 0.25 to 5 mols per mol of quaternary compound curing catalyst.

2. The composition of claim 1 in which the quaternary compound curing catalyst is a quaternary compound having the formula $(R')_4NOR''$, where $R'$ represents members selected from the class consisting of alkyl, cycloalkyl, aryl, alkaryl and aralkyl radicals, and where $R''$ is a member selected from the class consisting of hydrogen and alkyl radicals.

3. The composition of claim 1 in which the carboxylic acid is trichloroacetic acid.

4. A resinous composition of matter of improved stability against increase in viscosity at temperatures of from 25 to 50° C. comprising a methylphenylpolysiloxane resin solution, tetramethyl ammonium hydroxide, and trichloroacetic acid, said resin containing an average of from 1.1 to 1.85 total methyl and phenyl groups per silicon atom.

5. The process which comprises adding a halogenated aliphatic carboxylic acid to a methylphenylpolysiloxane resin solution containing a quaternary compound curing catalyst selected from the class consisting of quaternary ammonium compounds having the formula $(R')_4NOR''$ and quaternary phosphonium compounds having the formula $(R')_4POR''$, where $R'$ represents a member selected from the class consisting of alkyl, cycloalkyl, aryl, alkaryl, and aralkyl radicals and $R''$ represents a member selected from the class consisting of hydrogen and alkyl radicals, said halogented aliphatic carboxylic acid containing from 2 to 5 carbon atoms and containing 2 alpha-halogens selected from the class consisting of chlorine and bromine, said acid being present in an amount equal to from 0.25 to 5 mols per mol of quaternary compound curing catalyst, said resin containing an average of from 1.1 to 1.85 total methyl and phenyl groups per silicon atom, and thereafter heating the resulting solution to cure the resin.

6. The process of claim 5 in which the quaternary compound curing catalyst is tetramethyl ammonium hydroxide.

7. The process of claim 5 in which the halogenated aliphatic carboxylic acid is trichloroacetic acid.

References Cited in the file of this patent

UNITED STATES PATENTS

| | | |
|---|---|---|
| 2,571,533 | Britton et al. | Oct. 16, 1951 |
| 2,610,169 | Hyde et al. | Sept. 9, 1952 |
| 2,673,843 | Humphrey et al. | Mar. 30, 1954 |
| 2,755,261 | Clark | July 17, 1956 |
| 2,906,734 | Clark | Sept. 29, 1959 |

FOREIGN PATENTS

| | | |
|---|---|---|
| 1,169,966 | France | Sept. 15, 1958 |